United States Patent
Parthasarathy et al.

(10) Patent No.: US 12,536,373 B2
(45) Date of Patent: Jan. 27, 2026

(54) TOKEN OPTIMIZATION IN GENERATIVE LARGE LANGUAGE MODEL LEARNING (LLM) INTERACTIONS

(71) Applicant: Freshworks Inc., San Mateo, CA (US)

(72) Inventors: Ramesh Parthasarathy, Chennai (IN); Bruno Da Silva Bozza, Kirkland, WA (US); Vijay Raajaa, Bengaluru (IN)

(73) Assignee: Freshworks Inc., San Mateo, CA (US)

( * ) Notice: Subject to any disclaimer, the term of this patent is extended or adjusted under 35 U.S.C. 154(b) by 165 days.

(21) Appl. No.: 18/420,649

(22) Filed: Jan. 23, 2024

(65) Prior Publication Data

US 2025/0238616 A1 Jul. 24, 2025

(51) Int. Cl.
*G06F 40/00* (2020.01)
*G06F 40/284* (2020.01)

(52) U.S. Cl.
CPC .................. *G06F 40/284* (2020.01)

(58) Field of Classification Search
CPC .......... G06N 20/00; G06N 3/045; G06N 3/08; G06N 3/0455; G06N 3/09; G06N 3/084; G06N 3/082; G06N 3/088; G06N 3/0895; G06N 3/091; G06N 3/092; G06N 3/094; G06N 3/096; G06N 3/098; G06N 20/10; G06N 20/20; G06F 40/00; G06F 40/10; G06F 40/20; G06F 40/205; G06F 40/211; G06F 40/216; G06F 40/226; G06F 40/237; G06F 40/242; G06F 40/247; G06F 40/253; G06F 40/258; G06F 40/263; G06F 40/268; G06F 40/274; G06F 40/284; G06F 40/279; G06F 40/289; G06F 40/295; G06F 40/30; G06F 40/35; G06F 16/90332; G10L 15/065; G10L 15/07; G10L 15/075; G10L 15/08; G10L 15/083; G10L 2015/088; G10L 15/16; G10L 15/18; G10L 15/1807; G10L 15/1815; G10L 15/1822; G10L 15/183; G10L 15/187; G10L 15/19; G10L 15/193; G10L 15/197

See application file for complete search history.

(56) References Cited

U.S. PATENT DOCUMENTS 12,242,468 B1 * 3/2025 Brenner ................ G06F 16/242
2025/0165463 A1 * 5/2025 Brenner ................ G06F 16/242

OTHER PUBLICATIONS

Gao, Tianyu, Adam Fisch, and Danqi Chen. "Making pre-trained language models better few-shot learners." arXiv preprint arXiv: 2012.15723 (2020). (Year: 2020).*

(Continued)

*Primary Examiner* — Edgar X Guerra-Erazo
(74) *Attorney, Agent, or Firm* — LeonardPatel PC; Sheetal S. Patel; Michael A. Leonard, II

(57) ABSTRACT

Performing token optimization in generative artificial intelligence (AI) large language machine learning (LLM) interactions includes receiving, by at least one processor, a prompt from a user of a computing device, and analyzing, by the at least one processor, the prompt to identify one or more areas where the prompt can be improved. The analyzing the prompt comprises using a heuristic technique and one or more machine learning (ML) algorithms to identify the one or more areas of the prompt for improvement.

20 Claims, 4 Drawing Sheets

(56) References Cited

OTHER PUBLICATIONS

Deng, Mingkai, et al. "Rlprompt: Optimizing discrete text prompts with reinforcement learning." arXiv preprint arXiv:2205.12548 (2022). (Year: 2022).*

Sordoni, Alessandro, et al. "Joint prompt optimization of stacked llms using variational inference." Advances in Neural Information Processing Systems 36 (2023): 58128-58151. (Year: 2023).*

* cited by examiner

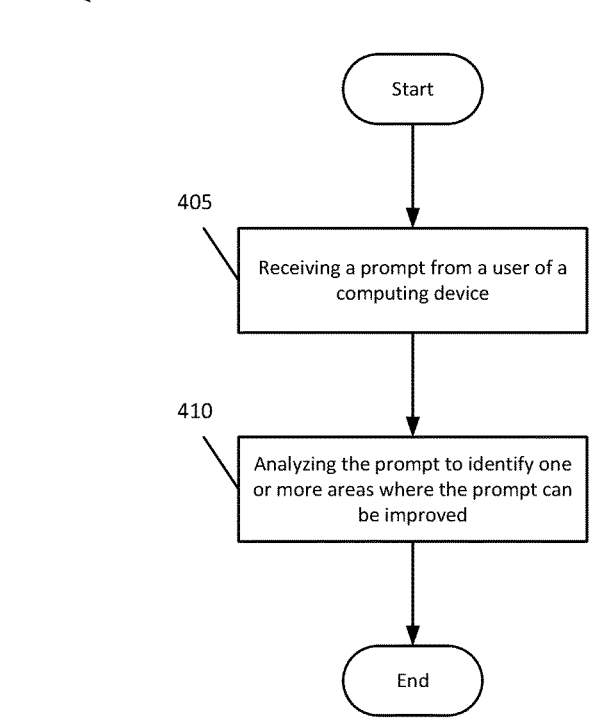

US 12,536,373 B2

TOKEN OPTIMIZATION IN GENERATIVE LARGE LANGUAGE MODEL LEARNING (LLM) INTERACTIONS

FIELD

The present invention relates to generative artificial intelligence (AI) large language machine learning (LLM) interactions.

BACKGROUND

Companies, such as OpenAI™ and Microsoft™, offer LLMs as a service and charge by total number of tokens used, both in the prompt (i.e., the input) and the generated text (i.e., the output). A token is a word or sub-word segment of a piece of text. The prompt is known to the user, but there may be many different prompts that lead to the same output, saving cost. For example, the sentence "come here promptly" may be tokenized as ["_come", "_here", "_prompt", "ly"], thereby being composed of four tokens instead of three. There is a need to decrease the size of the prompt (i.e., in number of tokens) with minimal change to the output. A prompt is defined as the input given to a model in order to generate a completion. In the example, "come here promptly" is the prompt. When the prompt is a question or instruction, a strong model is likely to generate a sensible answer. For example, a prompt can be "Question: What is the capital of the USA? Answer:", and the model is expected to generate "Washington, D.C.".

Existing generative AI LLM interactions face challenges in prompt quality, impacting output quality, cost, and latency. LLM interactions may include requests by an agent for the LLM to summarize a ticket or chat log, or detecting a particular end-user intent in a chatbot scenario, such obtaining a refund, or canceling a subscription. AI LLM interaction challenges may include the length and complexity of the prompt necessary to elicit an accurate response from the LLM, or the number of examples of correct that need to be provided.

To address this challenge, a systematic and intelligent solution is needed. For example, a technique for performing token optimization in generative AI LLM interactions may be beneficial.

SUMMARY

Certain embodiments of the present invention may provide solutions to the problems and needs in the art that have not yet been fully identified, appreciated, or solved by current email communication systems. For example, some embodiments generally pertain to token optimization in generative AI LLM interactions.

In an embodiment, a computer-implemented method for performing token optimization in generative AI LLM interactions. The method includes receiving, by at least one processor, a prompt from a user of a computing device, and analyzing, by the at least one processor, the prompt to identify one or more areas where the prompt can be improved. The analyzing the prompt includes using a heuristic technique and one or more machine learning (ML) algorithms to identify the one or more areas of the prompt for improvement.

In another embodiment, a system configured to perform token optimization in generative AI LLM interactions. The system includes memory comprising a set of instructions and at least one processor. The set of instructions are configured to cause at least one processor to execute receiving a prompt from a user of a computing device, and analyzing the prompt to identify one or more areas where the prompt can be improved. The analyzing of the prompt includes using a heuristic technique and one or more ML algorithms to identify the one or more areas of the prompt for improvement.

In yet another embodiment, a computer program, which is embodied on a non-transitory computer-readable medium, is configured to perform token optimization in generative AI LLM interactions. The computer program is configured to cause at least one process to execute receiving a prompt from a user of a computing device, and analyzing the prompt to identify one or more areas where the prompt can be improved. The analyzing of the prompt includes using a heuristic technique and one or more ML algorithms to identify the one or more areas of the prompt for improvement.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 4 is a flow diagram illustrating a method for performing token optimization in generative AI low LLM interactions, according to an embodiment of the present invention.

DETAILED DESCRIPTION OF THE EMBODIMENTS

Figure 1:
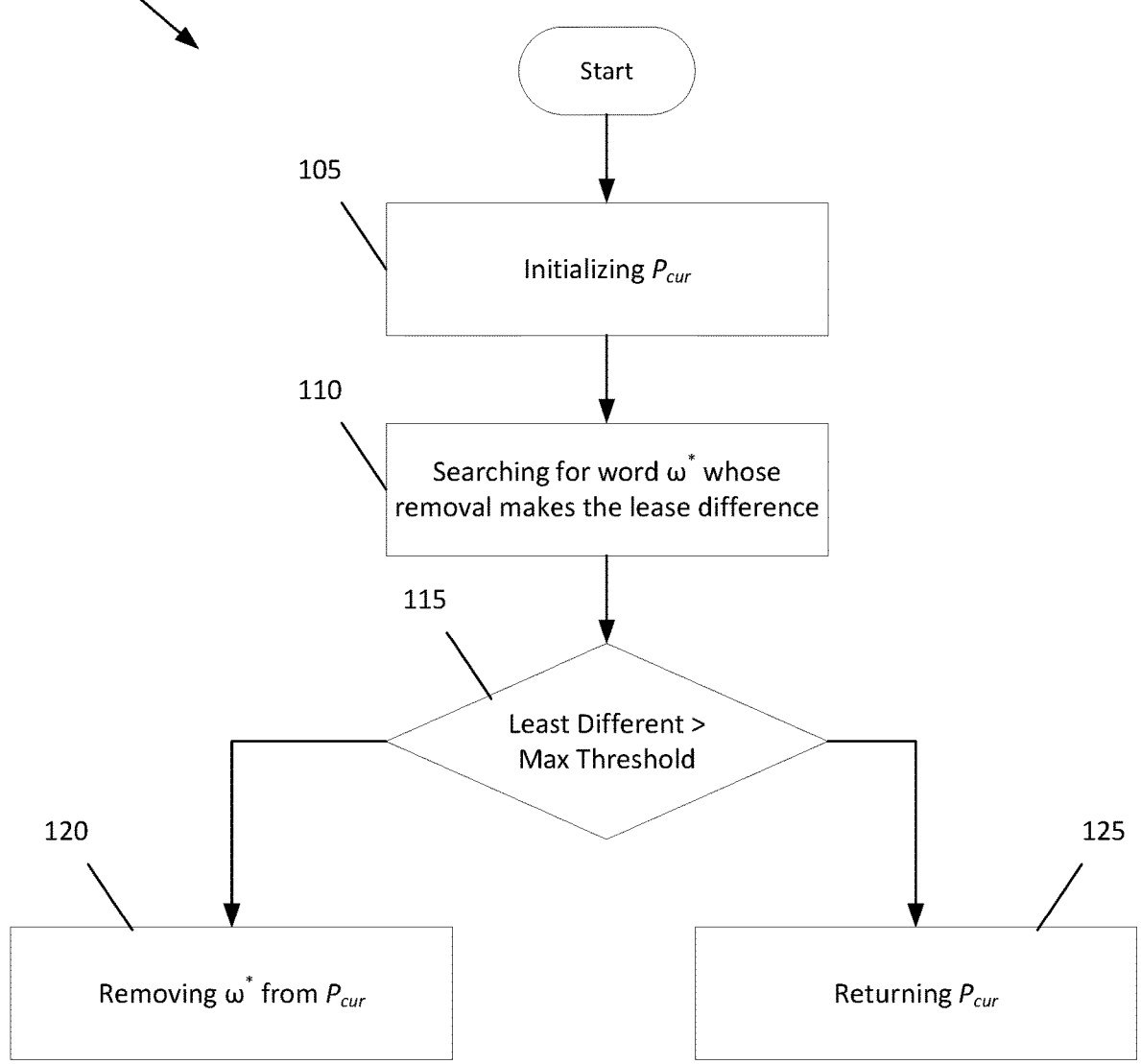
FIG. 1 is a flow diagram illustrating a method for performing tokenization in generative AI LLM interactions, according to an embodiment of the present invention.

Some embodiments generally pertain to token optimization in generative AI LLM interactions. In some embodiments, by performing token optimization prompts using heuristics and ML algorithms, prompts are intelligently analyzed without compromising accuracy. This technique reduces cost and latency, thereby enhancing the solution efficiency and cost-effectiveness. For example, if a LLM call to recognize a user intent in a chat bot were to use a 4,000-token prompt, and the cost was $0.008, then an optimized 2000-token prompt would cost $0.004 to accomplish approximately the same task. Since modern LLMs have a computational cost that grows roughly with the square of the prompt size, the technique described herein allows for better utilization of computational resources. For example, if a 4000-token prompt requires 100 TFLOPS (Trillion Floating-Point Operations) to compute, optimizing the prompt to use only 2000 would use just over 25 TFLOPs. In some further embodiments, generative AI LLM interactions are improved by optimizing prompts, leading to enhanced system performance and improved output quality. A shorter prompt might, for example, recognize user intents more accurately than original, longer prompt.

In some embodiments, a system and apparatus for token optimization in generative AI LLM interactions focuses on optimizing the prompt used in LLM interactions and recognizing the quality of the prompt, which may have a direct impact on the output quality, cost, and latency of the system. Since LLM calls are known to be expensive and time-consuming, a technique for intelligently analyzing and optimizing the prompt is discussed herein. LLM calls may be defined as requests made to a LLM for generating textual responses based on a given input prompt. This technique may improve the overall efficiency and effectiveness of LLM interactions, and combines heuristic techniques and ML algorithms to achieve this optimization.

By intelligently analyzing the prompt, the areas, where the prompt can be improved, are identified to obtain better results. Areas for improvement may include removing various parts of the original prompt, such as unnecessary words, prepositions, conjunctions, or entire sentences. The heuristic techniques consider linguistic patterns, context, and domain-specific knowledge to suggest modifications to the prompt. ML algorithms, trained on vast amounts of data, assist in generating optimized prompts based on historical patterns and semantic relevance. Vast amount of data may include crawled internet data such as web pages and message boards, as well as customer support tickets and chats.

The optimized prompt is constructed to balance accuracy, cost, and latency. This is done by repeatedly removing the prompt, the token that least disrupts the output, until change threshold is reached. While this technique reduces the overall cost and latency of LLM calls, the technique ensures that the quality and accuracy of the predicted outputs are not compromised significantly. In some embodiments, the technique achieves a delicate balance between the optimized prompt retaining a high level of accuracy compared to the original prompt and achieving notable improvements in cost and latency.

FIG. 1 is a flow diagram illustrating a method 100 for performing tokenization in generative AI LLM interactions, according to an embodiment of the present invention. In some embodiments, method 100 may include the following inputs:

An LLM function LLM (P,x) accepting a prompt template P and an input x. For purposes of explanation, a LLM function is a software function that takes as an input a prompt template and a user input, replaces the placeholder with the user input, and then, calls an LLM to provide the answer. A prompt template P may be defined as a prompt containing one or more specially marked placeholders, which are later substituted by user input before the language model is called. For example, a prompt template can be "Question: What is the capital of {user_country}. Answer:".

A prompt template P to be optimized.

A dataset D of inputs that is used to evaluate variants of the initial prompt template P. For example, a set of customer support chats paired with their respective summaries, generated manually or automatically.

A distance function Dist for evaluating the difference between LLM outputs. For purposes of explanation, the distance function Dist takes two pieces of text as input and returns a real number quantifying the difference between the inputs. In some embodiments, the LLM outputs may include BLEU score, Levenshtein distance, or a simple 0/1 inequality indicator.

Max_Threshold—the maximum expected different in outputs that we are willing to tolerate between the reference prompt template P and the optimized output template P*.

In this embodiment, method 100 begins at 105 with initializing $P_{cur}$, where $P_{cur}$ equals to P. For purposes of explanation, $P_{cur}$ is defined as the best prompt found by the algorithm until the current iteration, i.e., the one whose output is most similar to the original prompt P. At 110, the method includes searching for word $\omega^*$ whose removal makes the least difference to the original prompt. See, for example, FIG. 2, which is a flow diagram illustrating a method 200 for searching for a word whose removal makes the least difference, according to an embodiment of the present invention. In some embodiment, method 200 begins at 205 with setting $P_\omega$ to denote the prompt template P with word w removed. At 210, method 200 includes setting LLM Dist (P, $P_\omega$,x) to equal Dist(LLM(P,x),LLM(P$\omega$,x)) be the distance between the LLM outputs when using different prompt templates. At 215, method 200 includes setting $\omega^*$ to $\operatorname{argmin}_{\omega \in p} E_{x \in D}$LLM Dist (P,$P_\omega$,x) be the word whose removal makes the least difference in outputs and d*=LLM Dist(P,P$\omega$, $\omega^*$) be the least (absolute) difference. At 220, method 200 includes the tuple ($\omega^*$,d*) in its return. Tuple may be defined as a set with well-defined ordinal elements, in this case a pair with a first and a second elements.

Returning to FIG. 1, at 115, method 100 includes determining if the least difference is greater than a max threshold. Max threshold is a real number chosen by the user of method 100. Max threshold is expressed in the same unit used by the distance function (e.g., for the Levenshtein distance, the average number of inserts, changes and deletes).

At 120, if the least difference is not greater than the max threshold, then $\omega^*$ is removed from $P_{cur}$, and method 100 returns to step 110. Otherwise, at 125, method 100 is complete and $P_{cur}$ is returned.

Figure 2:
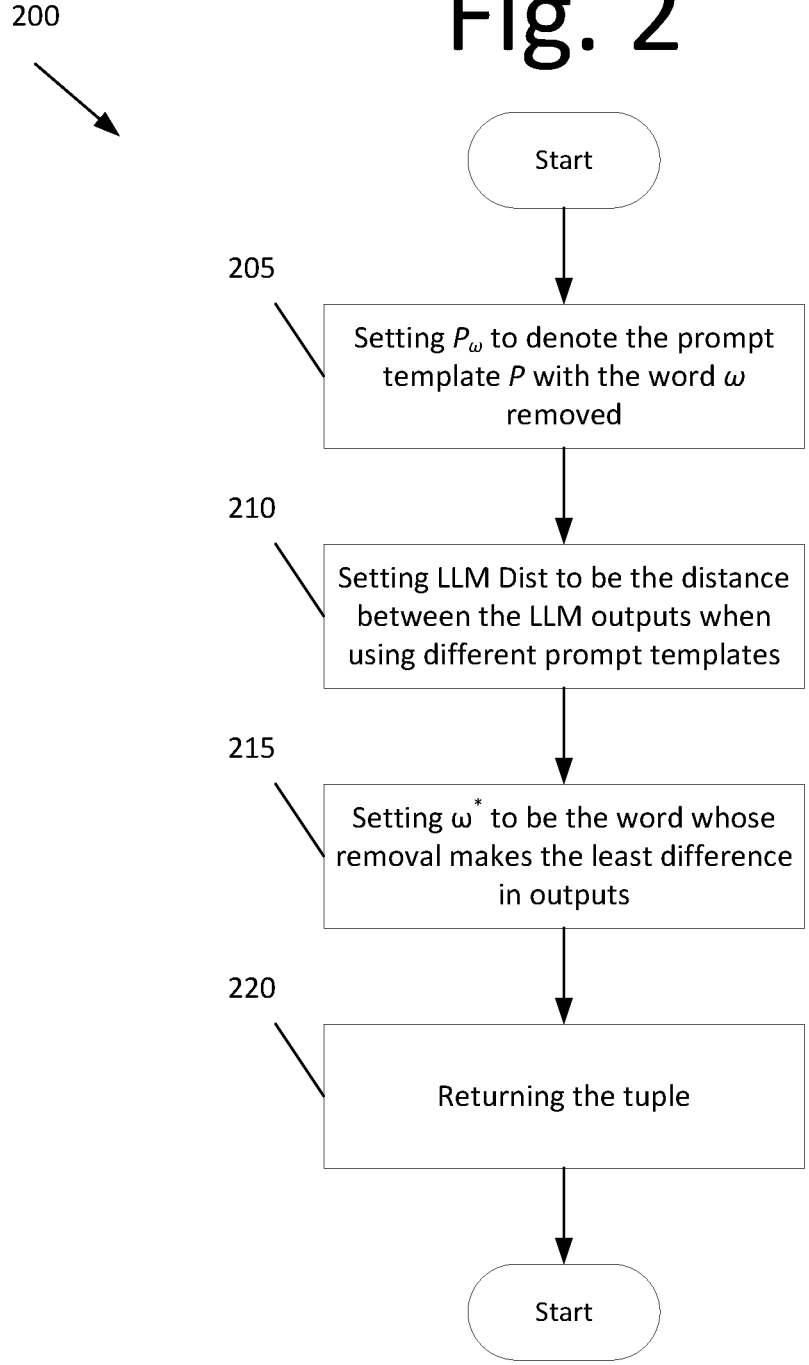
FIG. 2, which is a flow diagram illustrating a method for searching for a word whose removal makes the least difference, according to an embodiment of the present invention.

Stated another way, the embodiments described in FIGS. 1 and 2 are techniques or algorithms (e.g., a "greedy search" class of algorithms) that shortens prompts to be used with a *user provided* ML algorithm (e.g., the LLM in question).

Figure 3:
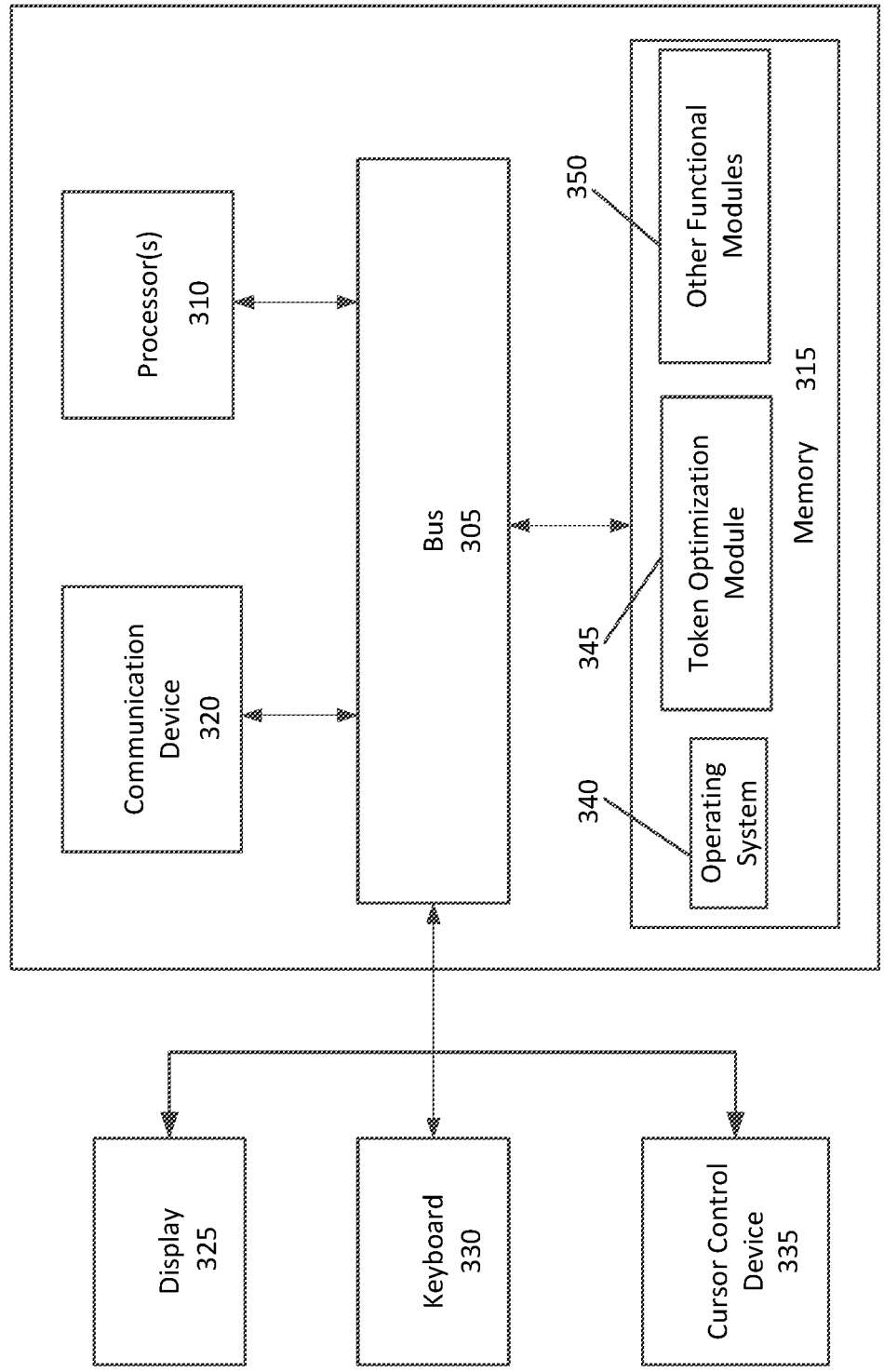
FIG. 3 is an architectural diagram illustrating a computing system configured to perform label biasing of data associated with closed deals using interpolation, according to an embodiment of the present invention.

FIG. 3 is an architectural diagram illustrating a computing system 300 configured to perform label biasing of data associated with closed deals using interpolation, according to an embodiment of the present invention. In some embodiments, computing system 300 may be one or more of the computing systems depicted and/or described herein. Computing system 300 includes a bus 305 or other communication mechanism for communicating information, and processor(s) 310 coupled to bus 305 for processing information. Processor(s) 410 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 310 may also have multiple processing cores, and at least some of the cores may be configured to perform specific functions. Multi-parallel processing may be used in some embodiments. In certain embodiments, at least one of processor(s) 310 may be a neuromorphic circuit that includes processing elements that mimic biological neurons. In some embodiments, neuromorphic circuits may not require the typical components of a Von Neumann computing architecture.

Computing system 300 further includes a memory 315 for storing information and instructions to be executed by processor(s) 310. Memory 315 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 310 and may include volatile media, non-volatile media, or both. The media may also be removable, non-removable, or both.

Additionally, computing system 300 includes a communication device 320, such as a transceiver, to provide access to a communications network via a wireless and/or wired connection. In some embodiments, communication device 320 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 310 are further coupled via bus 305 to a display 325, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 325 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 330 and a cursor control device 335, such as a computer mouse, a touchpad, etc., are further coupled to bus 305 to enable a user to interface with computing system. However, in certain embodiments, a physical keyboard and mouse may not be present, and the user may interact with the device solely through display 325 and/or a touchpad (not shown). Any type and combination of input devices may be used as a matter of design choice. In certain embodiments, no physical input device and/or display is present. For instance, the user may interact with computing system 300 remotely via another computing system in communication therewith, or computing system 400 may operate autonomously.

Memory 315 stores software modules that provide functionality when executed by processor(s) 310. The modules include an operating system 340 for computing system 300. The modules further include a token optimization module 345 that is configured to perform all or part of the processes described herein or derivatives thereof. Computing system 300 may include one or more additional functional modules 350 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 4 is a flow diagram illustrating a method 400 for performing token optimization in generative AI low LLM interactions, according to an embodiment of the present invention. In some embodiments, method 400 is configured to be executed by computing system 300 of FIG. 3. Method 400 may begin at 405 receiving, by at least one processor, a prompt from a user of a computing device. At 410, method 400 may include analyzing, by the at least one processor, the prompt to identify one or more areas where the prompt can be improved. The analyzing of the prompt comprises using a heuristic technique and one or more ML algorithms to identify the one or more areas of the prompt for improvement.

The process steps performed in FIGS. 1, 2, and 4 may be performed by a computer program, encoding instructions for the processor(s) to perform at least part of the process(es) described in FIGS. 1, 2, and 4, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 310 of computing system 300 of FIG. 3) to implement all or part of the process steps described in FIGS. 1, 2, and 4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for performing token optimization in generative artificial intelligence (AI) large language machine learning (LLM) interactions, the method comprising:
    receiving, by at least one processor, a prompt from a user of a computing device;
    analyzing, by the at least one processor, the prompt to identify one or more areas where the prompt requires improvement, wherein
    the analyzing the prompt comprises using a heuristic technique and one or more machine learning (ML) algorithms to identify the one or more areas of the prompt for improvement.

2. The computer-implemented method of claim 1, further comprising:
    initializing, by the at least one processor, $P_{cur}$, where $P_{cur}$ equals to an initial prompt P, wherein
    $P_{cur}$ is defined as a best prompt found by the ML algorithm until an output is most similar to an original prompt P.

3. The computer-implemented method of claim 2, further comprising:
    searching, by the at least one processor, for a word $\omega^*$ whose removal makes least difference to the original prompt.

4. The computer-implemented method of claim 3, wherein searching for the word $\omega^*$ whose removal makes least difference to the original prompt comprises
    setting $P_\omega$, by the at least one processor, to denote a prompt template P with word $\omega^*$ removed.

5. The computer-implemented method of claim 4, wherein searching for the word $\omega^*$ whose removal makes least difference to the original prompt comprises
    setting LLM Dist $(P, P_\omega, x)$, the LLM Distance between prompts P and $P_\omega$ with respect to input x, by the at least one processor, to equal Dist(LLM(P,x), LLM(P$\omega$,x)), the distance between the LLM outputs when applying prompts P and $P_\omega$, respectively, to input x, be a distance between LLM outputs when using two different prompt templates.

6. The computer-implemented method of claim 5, wherein searching for the word $\omega^*$ whose removal makes least difference to the original prompt comprises setting word ω* to a word whose removal makes the least difference in outputs and d*=LLM Dist(P,Pω,ω*) being the least difference.

7. The computer-implemented method of claim 6, wherein searching for the word ω* whose removal makes least difference to the original prompt comprises returning, by the at least one processor, the tuple (ω*,d*), wherein the tuple is defined as a set with well-defined ordinal elements, in this case a pair with a first and a second elements.

8. The computer-implemented method of claim 3, further comprising:

determining, by the at least one processor, if the least difference is greater than a max threshold, wherein the max threshold is a real number chosen by a user of a computing system.

9. The computer-implemented method of claim 8, further comprising:

removing, by the at least one processor, the word ω* when the least difference is not greater than the max threshold, or returning, by the at least one processor, $P_{cur}$.

10. A non-transitory computer-readable medium comprising a computer program for performing token optimization in generative artificial intelligence (AI) large language machine learning (LLM) interactions, wherein the computer program is configured to cause at least one processor to execute:

receiving a prompt from a user of a computing device;

analyzing the prompt to identify one or more areas where the prompt requires improvement, wherein the analyzing the prompt comprises using a heuristic technique and one or more machine learning (ML) algorithms to identify the one or more areas of the prompt for improvement.

11. The non-transitory computer-readable medium of claim 10, wherein the computer program is further configured to cause at least one processor to execute:

initializing $P_{cur}$, where $P_{cur}$ equals to an initial prompt P, wherein $P_{cur}$ is defined as a best prompt found by the ML algorithm until an output is most similar to an original prompt P.

12. The non-transitory computer-readable medium of claim 11, wherein the computer program is further configured to cause at least one processor to execute:

searching for a word ω whose removal makes least difference to the original prompt.

13. The non-transitory computer-readable medium of claim 12, wherein the computer program is further configured to cause at least one processor to execute:

setting $P_ω$ to denote a prompt template P with word ω* removed.

14. The non-transitory computer-readable medium of claim 13, wherein the computer program is further configured to cause at least one processor to execute:

setting LLM Dist (P,Pω,x), the LLM Distance between prompts P and $P_ω$ with respect to input x to equal Dist(LLM(P,x), LLM(Pω,x)), the distance between the LLM outputs when applying prompts P and $P_ω$, respectively, to input x, be a distance between LLM outputs when using two different prompt templates.

15. The non-transitory computer-readable medium of claim 14, wherein the computer program is further configured to cause at least one processor to execute:

setting word ω* to a word whose removal makes the least difference in outputs and d*=LLM Dist (P,Pω,ω*) being the least difference.

16. The non-transitory computer-readable medium of claim 15, wherein the computer program is further configured to cause at least one processor to execute:

returning the tuple (ω*, d*), wherein the tuple is defined as a set with well-defined ordinal elements, in this case a pair with a first and a second elements.

17. The non-transitory computer-readable medium of claim 12, wherein the computer program is further configured to cause at least one processor to execute:

determining if the least difference is greater than a max threshold, wherein the max threshold is a real number chosen by a user of a computing system.

18. The non-transitory computer-readable medium of claim 17, wherein the computer program is further configured to cause at least one processor to execute:

removing the word ω* when the least difference is not greater than the max threshold, or returning $P_{cur}$.

19. A system configured to perform token optimization in generative artificial intelligence (AI) large language machine learning (LLM) interactions, comprising:

at least one processor; and memory comprising a set of instructions, wherein the set of instructions configured to cause at least one processor to execute:

receiving a prompt from a user of a computing device;

analyzing the prompt to identify one or more areas where the prompt requires improvement, wherein the analyzing the prompt comprises using a heuristic technique and one or more machine learning (ML) algorithms to identify the one or more areas of the prompt for improvement.

20. The system of claim 19, the set of instructions is further configured to cause at least one processor to execute:

initializing $P_{cur}$, where $P_{cur}$ equals to an initial prompt P, wherein $P_{cur}$ is defined as a best prompt found by the ML algorithm until an output is most similar to an original prompt P.

* * * * *